Figure 1:
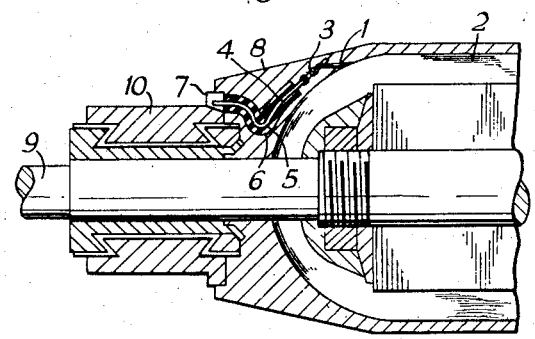

July 28, 1959

H. W. POWELL 2,897,385

ARMATURE WINDING CONNECTORS

Filed July 1, 1957

HAROLD W. POWELL
INVENTOR

BY
Wenderoth, Lind & Ponack
ATTORNEYS

United States Patent Office 2,897,385
Patented July 28, 1959

2,897,385
ARMATURE WINDING CONNECTORS

Harold W. Powell, Merton Park, London, England, assignor to Kango Electric Hammers Limited, London, England, a British company Application July 1, 1957, Serial No. 669,288

Claims priority, application Great Britain July 2, 1956

5 Claims. (Cl. 310—234)

This invention relates to the construction of armatures of the kind including conductors which need to be connected to commutator sections.

For the better protection of motor armatures it has, for example, been proposed to encase part of the commutator riser, the armature windings and the wires which connect these together, in a solid mass of plastic material. The use of thermosetting plastics for this purpose would involve the employment of expensive moulds to withstand the required temperature and pressure, but the use of resins, and in particular the epoxy or epoxide resins, which can, for instance, be cast at moderate temperatures under vacuum, has also been attended by certain disadvantages.

Epoxy or epoxide resins have been employed successfully in the production of electrical components, such as transformers, inductances, capacitors and the like, by a process known as encapsulation or embedding. Such a process has outstanding advantages when applied to the construction of armatures, but difficulties arise which are primarily due to the different co-efficients of expansion of the encasing resin and the materials embodied in the armature.

When armature windings are encapsulated it is desirable that the resin should fill the whole space between the commutator riser and the armature core laminations and encase the wires which join the armature windings to the commutator riser in order to reduce the effects of vibration and also to seal these connections against the ingress of dirt and moisture.

However, there is a difference in the expansion and contraction of the cast resin and the expansion and contraction of some of the other materials of which the armature assembly is composed. This difference in expansion or contraction is more noticeable where normal running temperatures vary considerably under working conditions and in particular when running temperatures are high. Consequently there is relative movement between the cast resin, the resin-encased connection and the commutator riser. If no steps are taken to compensate for this movement a pull will be exerted on the soldered connections between the commutator riser and the coil ends— which lead more or less directly to the cummutator riser— and this will result in loosening of the soldered joints or failure in the connections themselves; in some cases the connectors are of composite form, that is, the ends of paired coil wires are wound around and soldered to a short length of tough, fatigue-resistant wire which is soldered in a commutator riser slot.

The object of the present invention is to provide an improved method of and means for permitting movement of the connections above referred to, due to expansion and contraction in an encased armature, in such manner as not to impose undue stress on the connections and/or on soldered or other joints associated therewith.

With this object in view the present invention provides a resin-encased armature, in which each connection between the windings and commutator riser is wholly or partially sheathed in a slightly yieldable material, said connection or at least the sheathed part of said connection being of a length in excess of that required to extend direct in a straight line between the connected parts, so that during any relative movement between said connected parts the excess-length connection may extend and sag as required without restraint by reason of the slightly yielding nature of its sheath, thereby avoiding imposing strain on the connection or on any joint associated therewith.

The amount of excess in the length of the connection beyond that required to stretch in a straight line between points of attachment at its opposite ends may be determined by one or more factors; for instance, by the thickness of the sheathing used and the degree of yielding or compressibility of that sheathing, and the excess length may be such as to result simply in a slight bowing or curving of the connection. In other cases, the excess length required may make it necessary to form a kink or bend in the connection or even one or more complete loops.

Figure 2:
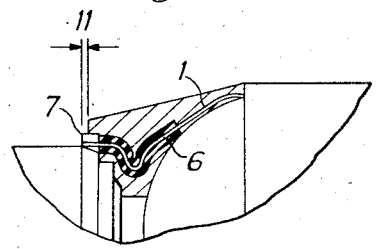

For the armature of a comparatively small electric motor, such as used in an electrically driven percussive hammer, a U-like bend in the connection would no doubt suffice, and by way of example, such an armature, protected by a cast resin encasure, and including sheathed U-bend connections according to this invention will now be more particularly described with reference to the accompanying drawing, wherein Figure 1 is a fragmentary longitudinal section through the commutator-end of a motor armature, and showing one form of connection, and Figure 2 is a detail view of a modified form of connection.

The armature shown fragmentarily in Figure 1 is an example of a conductor-carrying structure to which a protective encasure has been applied by a known encapsulation process making use of an epoxy or epoxide resin. Encapsulation of the greater part of an armature in a cast resin permits of the use of machine wound windings, where hitherto former-wound windings have been found necessary, and in the particular embodiment illustrated pairs of coil wires 1 are brought from the ends of the copper armature windings 2 and are wound round and firmly attached by solder joints 3 to short lengths of tough, fatigue-resistant connector wires 4, preferably of Phosphor bronze, a pair of coil wires 1 to each connector wire 4. Each connector wire 4 is preformed with a U-bend 5 and is sheathed in a tube or sleeve 6 made of slightly yieldable elastomer to which the resin used does not adhere; for instance, with an epoxide resin, a suitable sheathing material is a silicone rubber. This sheathing is thus accommodated in a tunnel-like path formed in the resin and preferably extends from the commutator riser 7, in a slot in which one end of wire 4 is soldered, right up to the soldered joint 3 between the other end of wire 4 and the associated pair of coil ends 1. Because of the different coefficients of expansion of, on the one hand, the cast resin encasure 8, applied by any suitable technique, and on the other hand, the armature shaft 9 and commutator 10 secured thereto, the distance between the end face of the resin encasure 8 and the exposed edge of the riser 7—indicated by dimension 11—varies with temperature and this movement points to the cause of failure of straight connectors or the loosening of the solder joints at the riser 7. This defect is effectively prevented in accordance with this invention by providing connections between the armature coil ends and the commutator riser of lengths in excess of the straight line distance between the connector wires 4 in conjunction with slightly yieldable or compressible sheathing 6 in the form of silicone rubber tubes or sleeves, which have been found to allow ample extension of the connector wires to compensate for the expansion and contraction which takes place during normal running, even when the operating conditions are somewhat severe, as in the case of armatures for the motors of electric percussive tools. The non-adhesion of the resin encasure 8 to the sheathing 6 ensures that full advantage is taken of the yieldable character of the sheathing material.

The precise form of the connector wire to enable it to function as an expansion loop is probably not critical and means other than the use of silicone rubber sheathing may be employed to prevent adhesion of the resin.

Figure 2 illustrates a modification in which the separate connector wires 4 are dispensed with and pairs of coil wires 1 are soldered direct to the commutator riser 7, the greater part of these paired coil wires 1 being provided with yieldable sheathing 6.

I claim:

1. An electric motor armature having a shaft, a core fixed on said shaft, a commutator structure secured on said shaft spaced from said core and comprising a plurality of risers, a winding assembly on said core and having a plurality of connections leading to the risers of said commutator, and a continuous resinous mass encasing said connections, characterised in that each of said encased connections is snugly sheathed in a slightly yieldable material which retains its resiliency when encased in said resinous mass, the sheathed connection having a length in excess of that required to extend directly from the winding to the appropriate commutator riser within the tunnel-like path provided by the connection encasing mass to admit of straightening out of the connection to compensate for relative movements between the winding-supported core and the commutator due to differential expansion.

2. A resin-encased armature as claimed in claim 1, wherein the excess length required in the connection is provided by bending said connection.

3. A resin-encased armature as claimed in claim 1, in which the sheathing comprises a tube of resilient material enclosing at least part of the length of the excess length connection.

4. A resin-encased armature as claimed in claim 1, further characterised in that the sheathed excess-length connection is separate from both the conductor and terminal elements of said armature.

5. A resin-encased armature as claimed in claim 1, further characterised in that the sheathed excess-length connector constitutes an integral extension of the conductors of said armature.

References Cited in the file of this patent

UNITED STATES PATENTS

| | | |
|---|---|---|
| 2,078,024 | Roth | Apr. 20, 1937 |
| 2,154,740 | Forss | Apr. 18, 1939 |
| 2,202,820 | Baird | June 4, 1940 |
| 2,318,786 | Korte | May 11, 1943 |
| 2,790,101 | Clagett | Apr. 23, 1957 |